United States Patent
Katsunuma

(10) Patent No.: US 9,459,653 B2
(45) Date of Patent: Oct. 4, 2016

(54) DISPLAY DEVICE

(71) Applicant: ALPINE ELECTRONICS, INC., Shinagawa-ku, Tokyo (JP)

(72) Inventor: Hideto Katsunuma, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 133 days.

(21) Appl. No.: 14/514,061

(22) Filed: Oct. 14, 2014

(65) Prior Publication Data

US 2015/0146359 A1   May 28, 2015

(30) Foreign Application Priority Data

Nov. 26, 2013   (JP) ................................. 2013-244154

(51) Int. Cl.
| | | |
|---|---|---|
| G06F 1/16 | (2006.01) | |
| B60K 35/00 | (2006.01) | |
| F16M 11/00 | (2006.01) | |

(52) U.S. Cl.
CPC ............. *G06F 1/1601* (2013.01); *B60K 35/00* (2013.01); *F16M 11/00* (2013.01)

(58) Field of Classification Search
CPC ................................ G06F 1/16; G06F 1/1601
See application file for complete search history.

(56) References Cited

U.S. PATENT DOCUMENTS

| | | | | |
|---|---|---|---|---|
| 5,715,138 A * | 2/1998 | Choi ....................... | F16M 11/10 248/923 |
| 6,381,125 B1 * | 4/2002 | Mizoguchi ............ | F16M 11/24 312/223.1 |
| 6,583,773 B1 * | 6/2003 | Nogami ................. | B60K 35/00 248/917 |
| 7,198,240 B2 * | 4/2007 | Chen .................... | B60R 11/0235 248/284.1 |
| 7,628,371 B2 * | 12/2009 | Gan ....................... | F16M 11/04 248/162.1 |
| 7,659,881 B2 * | 2/2010 | Lee ........................ | B60R 11/02 312/319.6 |
| 9,216,701 B2 * | 12/2015 | Kato .................... | B60R 11/0235 |
| 2003/0142064 A1 * | 7/2003 | Wang .................. | B60R 11/0235 345/156 |
| 2005/0264983 A1 * | 12/2005 | Chen .................... | G06F 1/1601 361/679.27 |
| 2008/0265113 A1 * | 10/2008 | Lin ....................... | F16M 11/046 248/176.3 |

FOREIGN PATENT DOCUMENTS

JP    A1 2010-012880    2/2010

* cited by examiner

*Primary Examiner* — Anthony Q Edwards
(74) *Attorney, Agent, or Firm* — Brinks Gilson & Lione

(57) ABSTRACT

A shaft is rotatably supported by an upper housing (base), a raising and lowering gear for a monitor is rotatably supported by the shaft, and a pivot gear and a guide member are unrotatably supported by the shaft. A rack and a guide rail are disposed on the back face of the monitor such that the raising and lowering gear meshes the rack and the guide member slidably engages with the guide rail. When the raising and lowering gear rotates by a drive source of a first motor, the guide rail is guided by the guide member to move upward and downward, and accordingly, the height position of the monitor is adjusted. When the pivot gear rotates by a drive source of a second motor, the guide member rotates along with the shaft, and accordingly, the tilt angle of the monitor is adjusted.

18 Claims, 12 Drawing Sheets

DISPLAY DEVICE

RELATED APPLICATION

The present application claims priority to Japanese Patent Application Number 2013-244154, filed Nov. 26, 2013, the entirety of which is hereby incorporated by reference.

BACKGROUND

1. Field of the Invention

The present invention relates to display devices having a function of adjusting a height position and a tilt angle of a monitor.

2. Description of the Related Art

Display devices for vehicles are commonly used which include a raising and lowering mechanism for moving a monitor to a use position and a tilt mechanism for adjusting a tilt angle of a monitor, and the raising and lowering mechanism and the tilt mechanism are operated by a motor as a drive source. As a conventional example of such display devices, Japanese Unexamined Patent Application Publication No. 2010-12880 discloses a display device which includes first and second guide holes on a base which is disposed on the back face of a monitor and first and second shafts that engage with the first and second guide holes, respectively, on a bracket which supports the monitor so as to perform a raising and lowering operation and a tilt operation by moving the first and second shafts along the corresponding first and second guide holes when a drive force in the up and down direction is applied from a drive mechanism mounted on the base to the bracket. The first guide hole is formed as an elongated hole which straightly extends in the up and down direction, while the second guide hole has a straight portion which extends parallel to the first guide hole and an inclined portion which extends from the upper end of the straight portion.

In the display device having such a general configuration, the monitor can be moved to a use position by a raising and lowering operation when the first shaft is guided by the first guide hole to move in the up and down direction and the second shaft is guided by the straight portion of the second guide hole to move in the up and down direction. Further, the monitor can be held at a desired tilt angle by a tilt operation since the bracket pivots about the first shaft when the first shaft is guided at a position adjacent to the upper end of the first guide hole and the second shaft is guided by the inclined portion of the second guide hole after passing the straight portion of the second guide hole.

However, in the display device disclosed in Japanese Unexamined Patent Application Publication No. 2010-12880, the raising and lowering operation and the tilt operation of the monitor are switched according to the engagement position of the second shaft which moves along the straight portion and the inclined portion of the second guide hole. As a result, the height position in which the tilt angle of the monitor is adjusted is limited to one location, and this may cause a problem that a tilt adjustment may not be performed at an optimal raised and lowered position desired by a user. Further, in order to perform tilt adjustment of the monitor, it is necessary to provide a third guide hole on the bracket and a third shaft on the base to be guided by the third guide hole, which leads to a complicated structure. In addition, since the positions of the first to third guide holes and the first to third shafts need to be offset in the front and back direction, the entire depth dimension of the display device becomes large, which causes a problem that the display device may not be used in a certain type of vehicle which does not have a sufficient space for installation.

SUMMARY

It is an object of the present disclosure to provide a display device which performs a tilt adjustment regardless of the raised and lowered position of the monitor while reducing the depth dimension of the display device.

According to an aspect of the disclosure, a display device in which a monitor disposed on a front face of a base is supported in a manner capable of raising and lowering and tilting with respect to the base includes a rack and a guided member mounted on a back face of the monitor so as to extend parallel to each other in a height direction of the monitor, a raising and lowering gear that meshes with the rack, a first drive mechanism that drives rotation of the raising and lowering gear, a guide member that guides the guided member in a manner capable of raising and lowering, a second drive mechanism that drives rotation of the guide member, and a shaft rotatably supported by the base so as to extend in a width direction of the monitor, wherein one of the raising and lowering gear and the guide member is rotatably supported by the shaft and the other is unrotatably supported by the shaft.

In the display device having the above configuration, when the raising and lowering gear that meshes with the rack rotates in either the forward or reverse direction by the first drive mechanism, rotation of the raising and lowering gear is converted into a linear motion of the monitor via a mesh portion of the rack. Accordingly, the guided member moves in the up and down direction while being guided by the guide member, and the raised and lowered position of the monitor can be adjusted. Further, when the guide member that engages with the guided member rotates by the second drive mechanism, the monitor pivots about the shaft by rotation of the guide member, and the tilt angle of the monitor can be adjusted. Since one of the raising and lowering gear and the guide member is rotatably supported by the shaft and the other is unrotatably supported by the shaft, the guide member does not rotate during the raising and lowering operation of the monitor performed by rotation of the raising and lowering gear, and the raising and lowering gear does not rotate during tilt adjustment of the monitor performed by rotation of the guide member. Accordingly, the tilt adjustment can be performed regardless of the height position of the monitor. In addition, since the rotation center of the raising and lowering gear and the pivot center of the guide member are coaxially located, the entire depth dimension of the display device can be reduced.

Although the above configuration is configured such that one of the raising and lowering gear and the guide member is rotatably supported by the shaft and the other is unrotatably supported by the shaft, when the raising and lowering gear is rotatably supported by the shaft and the guide member and the pivot gear are rotatably supported by shaft, the pivot gear and the shaft and the guide member may be driven to integrally rotate by transmitting a drive force of the second drive mechanism to the pivot gear.

On the other hand, when the raising and lowering gear is unrotatably supported by the shaft and the guide member and the pivot gear are rotatably supported by shaft, a drive force of the second drive mechanism may be transmitted to the guide member via the pivot gear by connecting the guide member and the pivot gear in an unrotatable manner.

Further, in the above configuration, it is preferable that the rack is disposed at a center portion on the back face of the monitor and a pair of the guided members is disposed on both sides of the rack on the back face of the monitor, and a pair of guide members is supported on both ends of the shaft so as to correspond to the guided members. According to this configuration, the raising and lowering operation and the tilt operation of the monitor can be smoothly performed in a balanced manner.

Further, in the above configuration, it is preferable that the shaft has a holding section having a circular cross section and a stepped down portion having a non-circular cross section, and one of the raising and lowering gear and the guide member is rotatably supported by the holding section and the other is unrotatably engaged with the stepped down portion. According to this configuration, the shaft having the holding section and the stepped down portion can be easily manufactured by chamfering both ends of the round rod made of metal in a D shape or a double D shape, and the raising and lowering gear and the guide member can be easily assembled to the shaft.

According to the display device of the present disclosure, one of the raising and lowering gear and the guide member is rotatably supported by the shaft, while the other is unrotatably supported by the shaft. The guide member does not rotate during the raising and lowering operation of the monitor performed by rotation of the raising and lowering gear, while the raising and lowering gear does not rotate during tilt adjustment of the monitor performed by rotation of the guide member. Accordingly, the tilt adjustment can be performed regardless of the height position of the monitor, and in addition to that, since the rotation center of the raising and lowering gear and the pivot center of the guide member are coaxially located, the entire depth dimension of the display device can be reduced.

DESCRIPTION OF THE PREFERRED EMBODIMENTS

Figure 1:
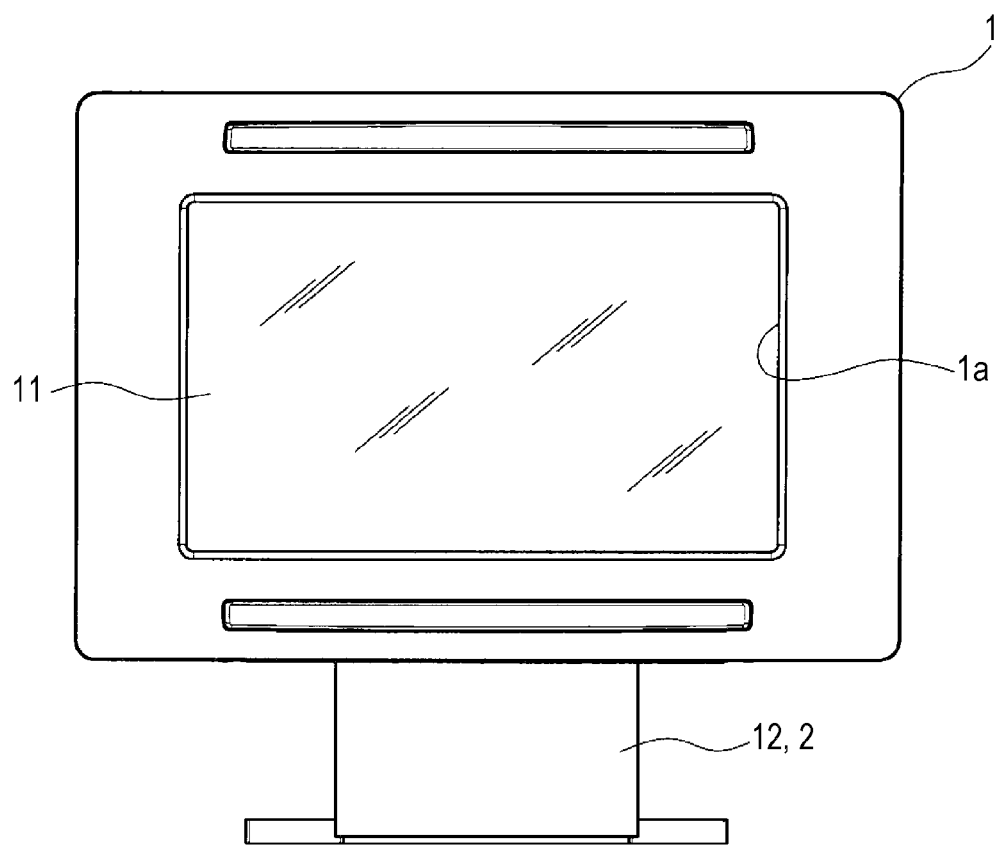
FIG. 1 is a front view of a display device according to a first embodiment of the present invention.

Embodiments of the invention will be described with reference to the drawings. As shown in FIGS. 1 to 11, a display device according to the first embodiment of the invention mainly includes a monitor 1 formed in a cuboid shape, a base 2 that supports the monitor 1 while allowing raising and lowering and tilting of the monitor 1, first and second motors 3, 4 mounted on the base 2, a shaft 5 which is rotatably supported by the base 2, a raising and lowering gear 6 and a pivot gear 7 and a pair of guide members 8 inserted over the shaft 5, a rack 9 and a pair of guide rails 10 disposed on the back face of the monitor 1. A display panel 11 formed of an LCD or the like is housed in the monitor 1, and the display panel 11 is exposed through a rectangular opening 1a formed on the front face of the monitor 1.

Figure 9:
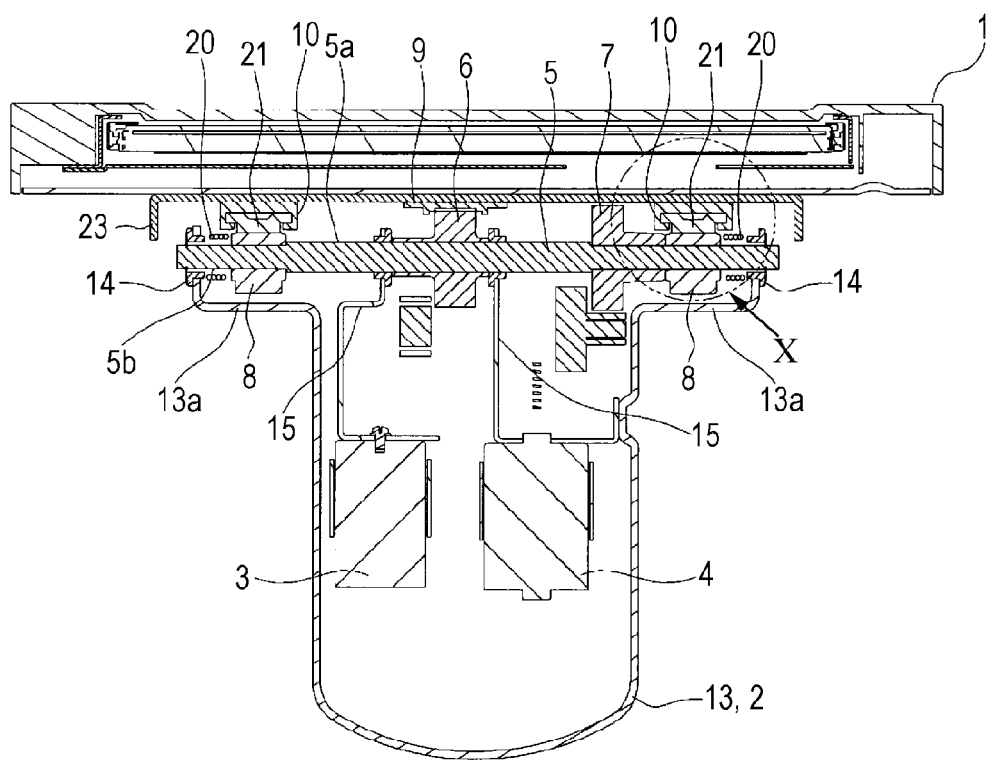
FIG. 9 is a sectional view taken along the line IX-IX of FIG. 8.

The base 2 is composed of a lower housing 12 which houses circuit components, which are not shown in the figure, and an upper housing 13 disposed on the top surface of the lower housing 12 with the top surface of the upper housing 13 being closed by a cover, which is not shown in the figure. Although detailed description is omitted, an oscillating mechanism is housed in the lower housing 12 so as to rotate the upper housing 13 and the entire monitor 1 within a range of predetermined angle about a rotation shaft which extends in the up and down direction. The upper housing 13 is provided with L-shaped arms 13a which extend from both sides on the front end of the upper housing 13, and the arms 13a support each end of the shaft 5 in a rotatable manner via a bearing 14. The shaft 5 is a round rod made of a metal, both ends of which are chamfered in a double D shape. As shown in FIG. 9, the center portion which is not chamfered is a holding section 5a having a circular cross section, while the both ends which are chamfered are stepped down portions 5b having a cross section of a non-circular shape (oval shape).

The raising and lowering gear 6 is rotatably supported by the shaft 5 by inserting a circular shaft hole over the holding section 5a, and the movement of the shaft 5 in the axis direction is regulated by a pair of regulation plates 15 disposed on the upper housing 13. The raising and lowering gear 6 is rotatable about the shaft 5 by a drive source of the first motor 3. Specifically, a worm gear 16 is mounted on the rotation shaft of the first motor 3 so that the rotation of the first motor 3 is transmitted from the worm gear 16 to the raising and lowering gear 6 via a reduction gear train 17 (see FIGS. 4 and 7). The first motor 3, the worm gear 16 and the reduction gear train 17 form a first drive mechanism that rotates the raising and lowering gear 6.

The pivot gear 7 is unrotatably supported by the shaft 5 by inserting an oval shaft hole over one of the stepped down portions 5b, and the pivot gear 7 is driven to co-rotate with the shaft 5 by a drive source of the second motor 4. Specifically, a worm gear 18 is mounted on the rotation shaft of the second motor 4 so that the rotation of the second motor 4 is transmitted from the worm gear 18 to the pivot gear 7 via a reduction gear train 19 (see FIGS. 4 and 6). The second motor 4, the worm gear 18 and the reduction gear train 19 form a second drive mechanism that rotates the pivot gear 7 and the guide members 8, which will be described later.

The stepped down portions 5b on both ends of the shaft 5 are supported by the guide members 8, and the guide members 8 are unrotatably supported by the shaft 5 by inserting an oval shaft hole over the stepped down portion 5b. Therefore, when the pivot gear 7 is driven to rotate by a drive source of the second motor 4, the shaft 5 rotates along with the pivot gear 7 and the guide members 8, while the raising and lowering gear 6 remains supported by the shaft 5 and does not rotate. On the other hand, when the raising and lowering gear 6 is driven to rotate by a drive source of the first motor 3, the raising and lowering gear 6 rotates about the shaft 5, while the shaft 5 and the pivot gear 7 and the guide member 8 do not rotate.

Figure 5:
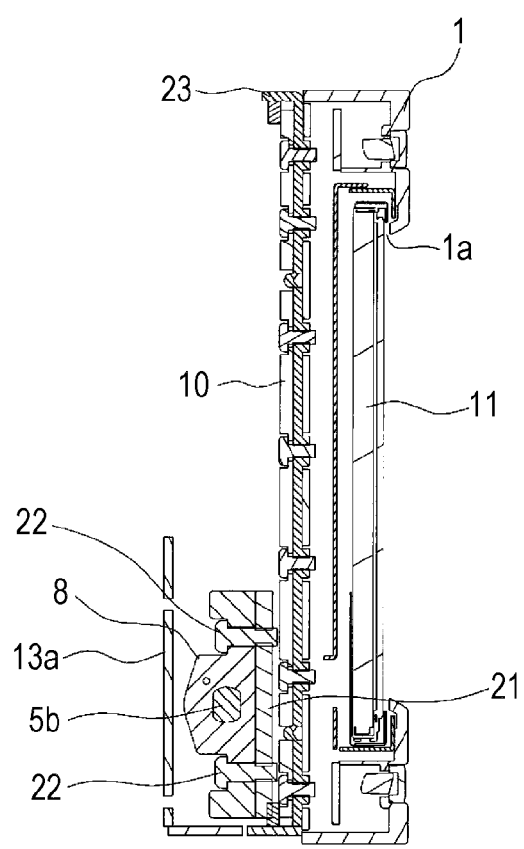
FIG. 5 is a sectional view taken along the line V-V of FIG. 4.
Figure 6:
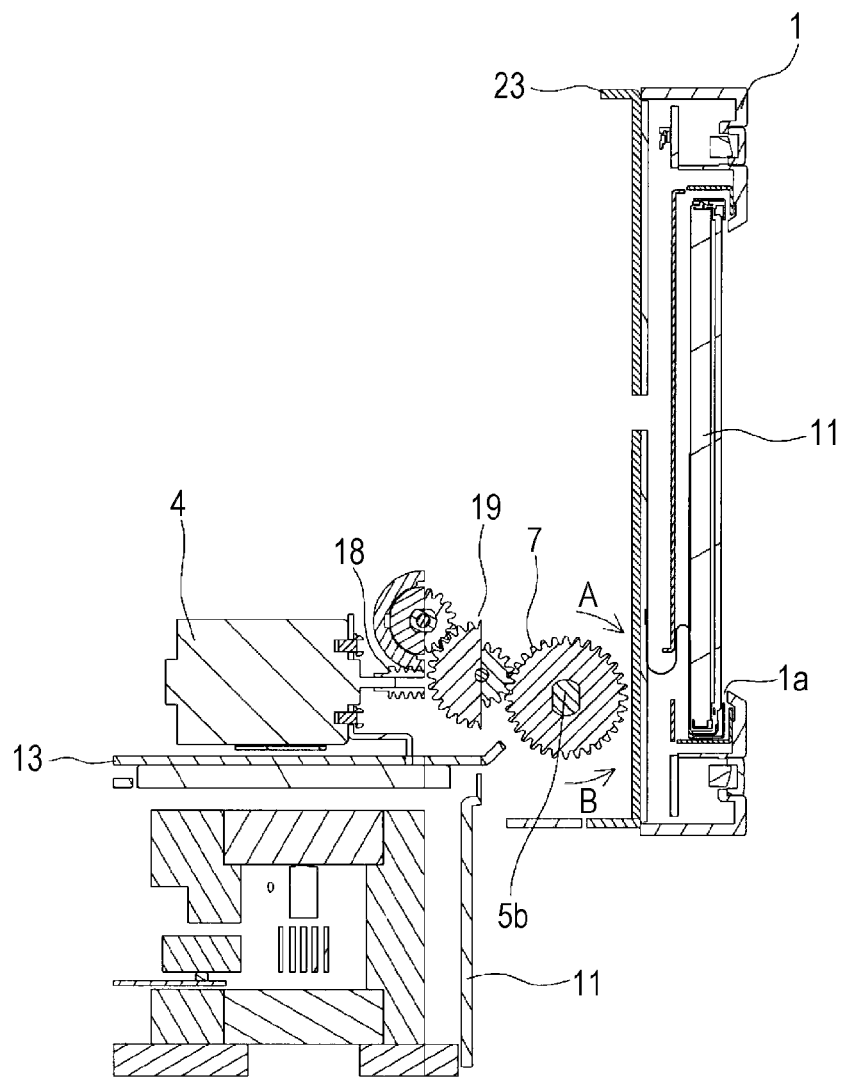
FIG. 6 is a sectional view taken along the line VI-VI of FIG. 4.
Figure 7:
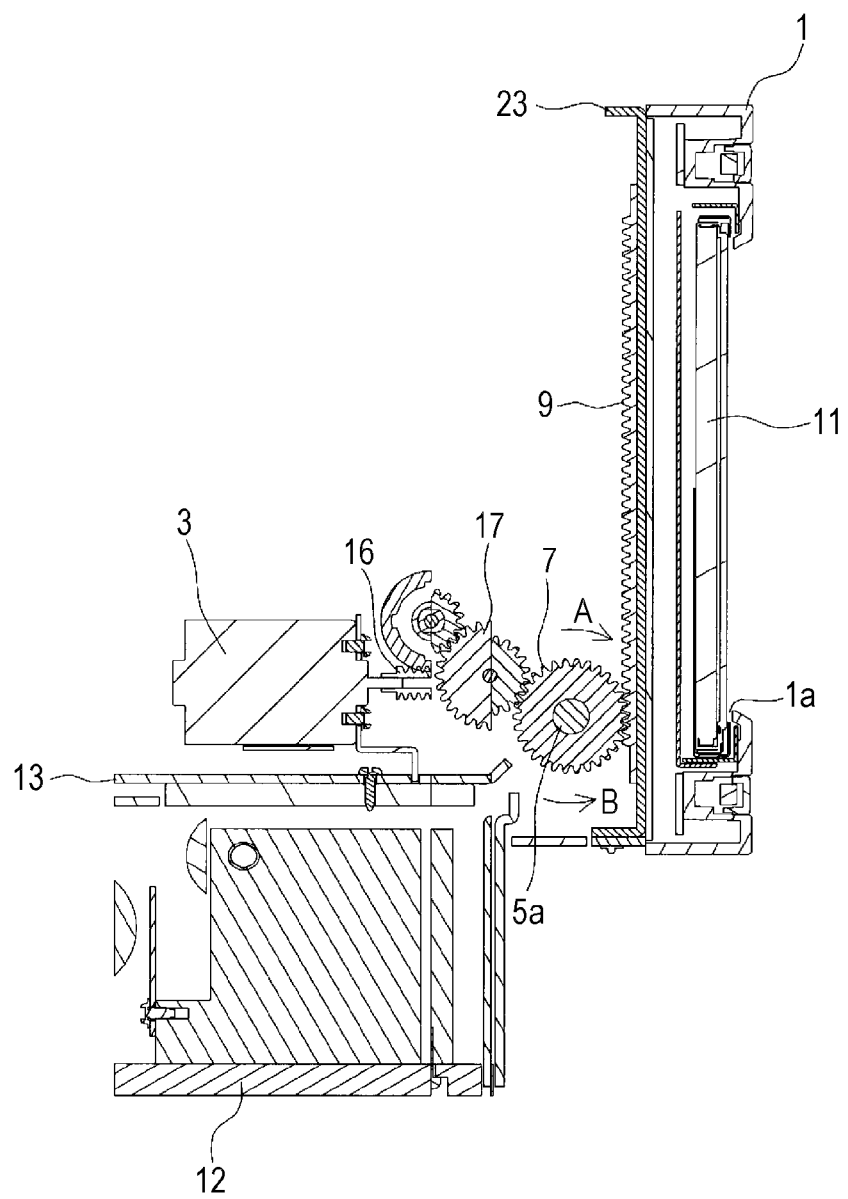
FIG. 7 is a sectional view taken along the line VII-VII of FIG. 4.
Figure 8:
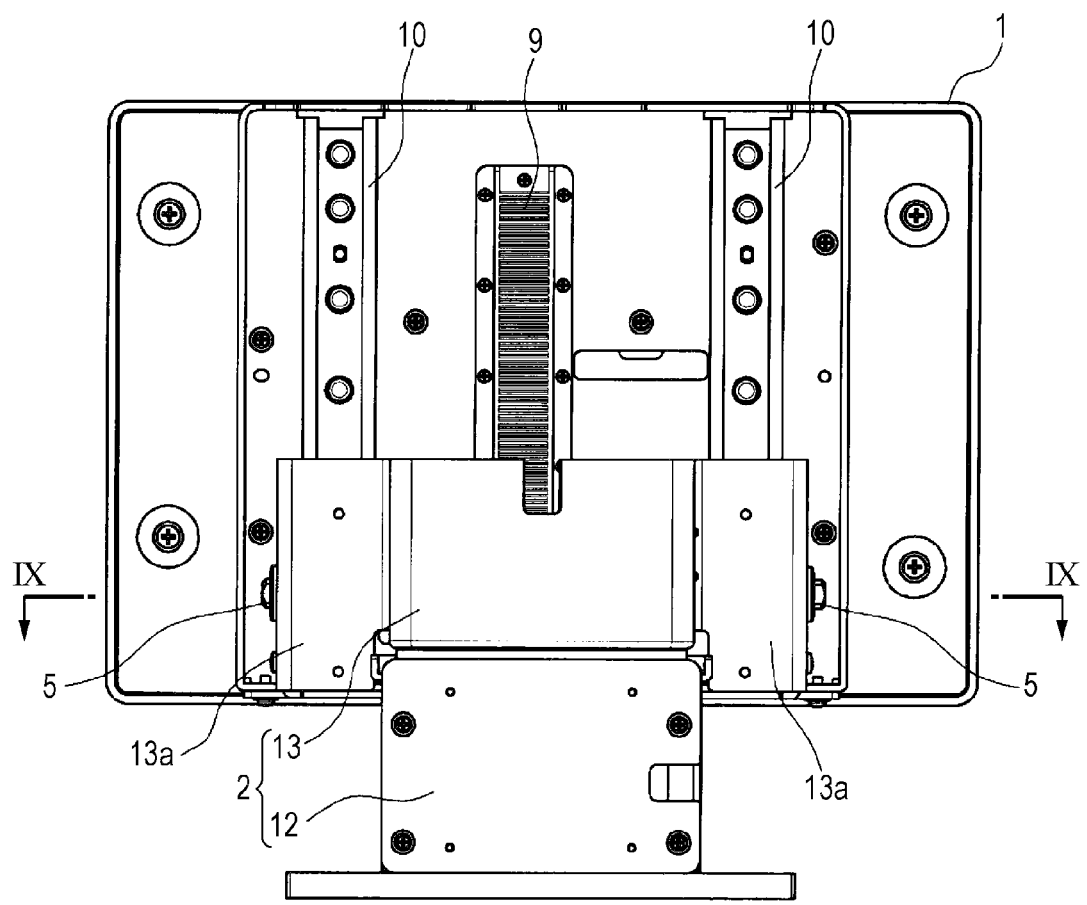
FIG. 8 is a rear view of the display device.

A coil spring 20 is interposed between the guide member 8 and the arm 13a of the upper housing 13, and a resilient force of the coil spring 20 reduces the chattering of the guide members 8 in the thrust direction. As shown in FIG. 5, a slide plate 21 is disposed on the front face of the guide members 8 and is integrated with the guide members 8 by a screw 22. The guide members 8 and the slide plate 21 may be integrally formed by a synthetic resin or the like.

A bracket 23 is fixed to the back face of the monitor 1, and the rack 9 and a pair of guide rails 10 are mounted on the bracket 23 so as to extend parallel to each other in the up and down direction. The rack 9 is disposed at the center portion on the back face of the monitor 1, and the guide rails 10 are disposed on both sides of the rack 9 on the back face of the monitor 1. The raising and lowering gear 6 is meshed with the rack 9 such that a rack-and-pinion mechanism is formed by the raising and lowering gear 6 and the rack 9 to convert a rotational force into a linear motion. The guide rails 10 are guided members that are guided by the guide members 8, and each of the slide plates 21 are slidably fitted in the guide rails 10.

Figure 10:
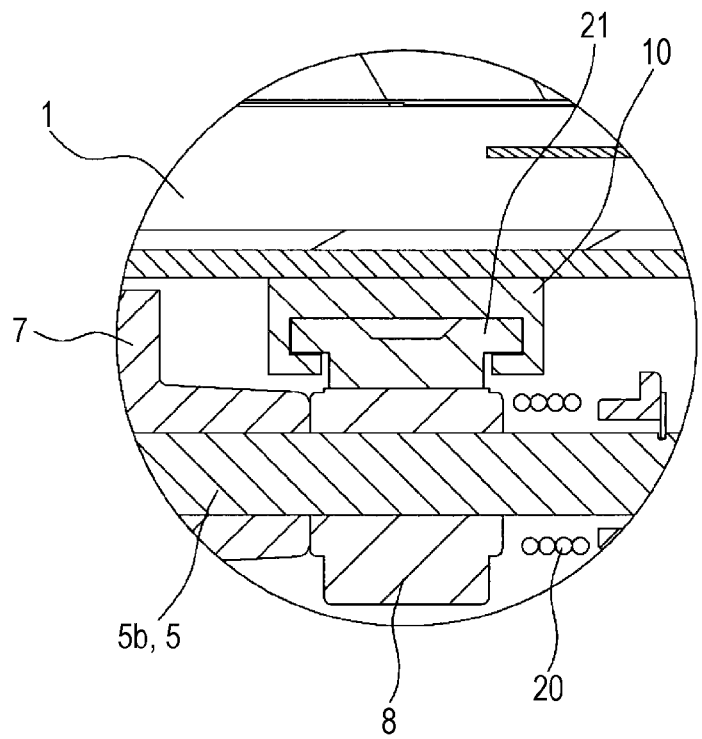
FIG. 10 is an enlarged view of the area X of FIG. 9.

As shown in FIG. 10, both ends of the guide rail 10 in the width direction have a U-shaped cross section. The U-shaped portions engage with each side of the slide plate 21 so that the slide plate 21 is not dropped from the guide rail 10. When the guide members 8 integrally rotate with the shaft 5 by rotation of the pivot gear 7, rotation of the guide members 8 is transmitted to the monitor 1 via the engagement of the slide plates 21 and the guide rails 10 since the guide members 8 are integrally connected to the slide plates 21 which engage with the guide rails 10. Accordingly, the monitor 1 can pivot about the shaft 5 and adjustment of the tilt angle (tilt operation) can be performed. Further, when a drive force in the extension direction of the rack 9 is applied to the monitor 1 by rotation of the raising and lowering gear 6, the guide rails 10 are guided by a pair of slide plates 21 which is integrally connected to the guide members 8 and move in the extension direction. Accordingly, adjustment of the height position of the monitor 1 with respect to the base 2 (raising and lowering operation) can be performed.

Figure 2:
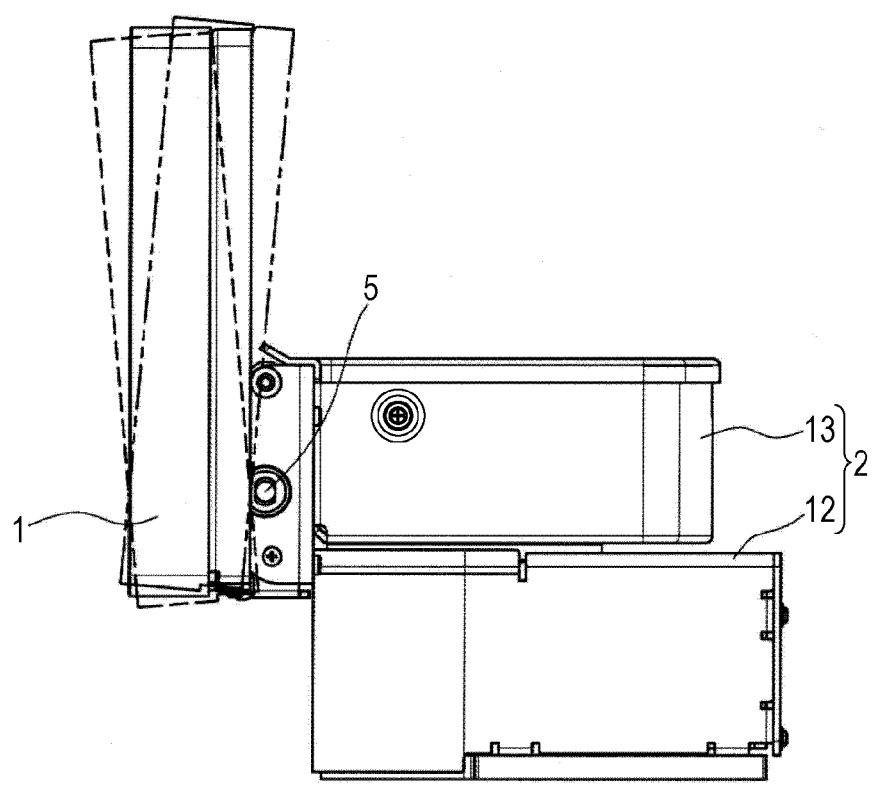
FIG. 2 is a side view of the display device.
Figure 3:
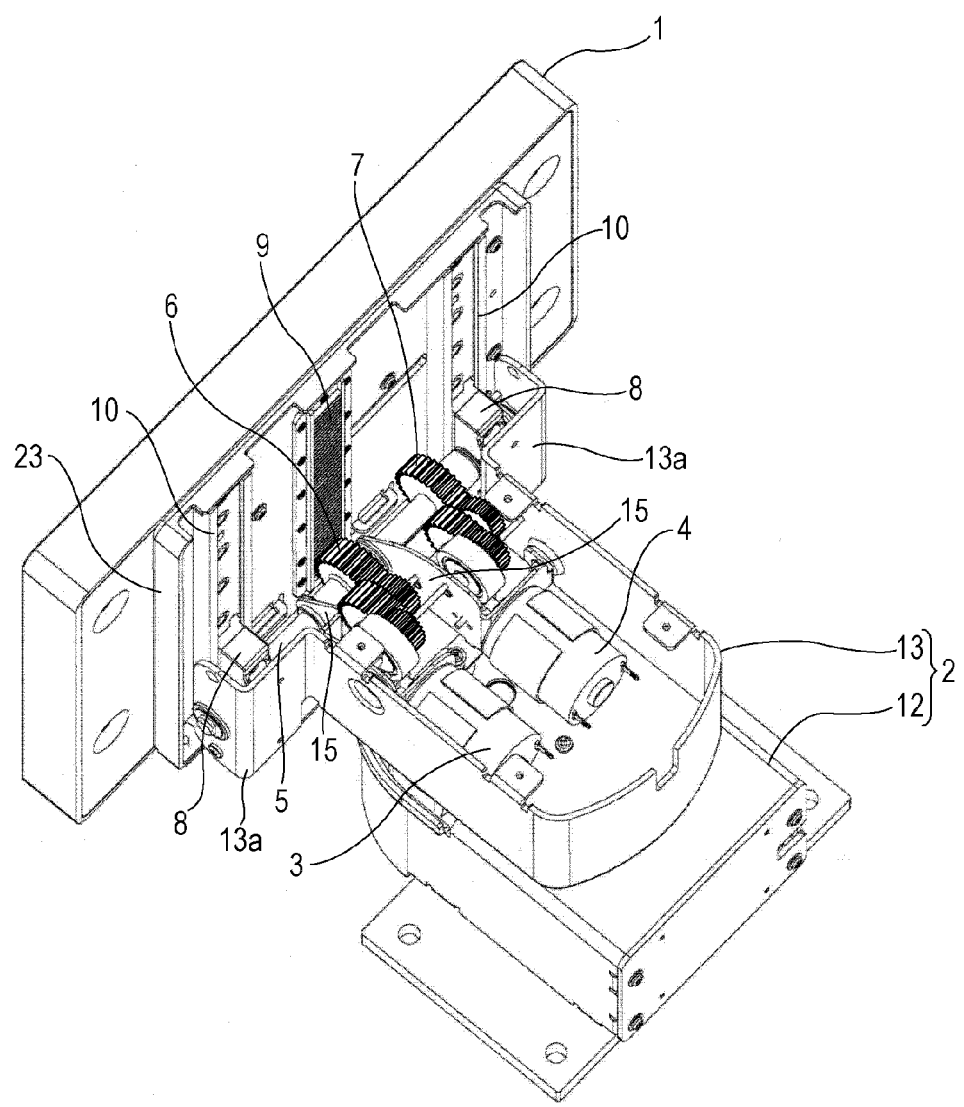
FIG. 3 is a perspective view of the display device.
Figure 4:
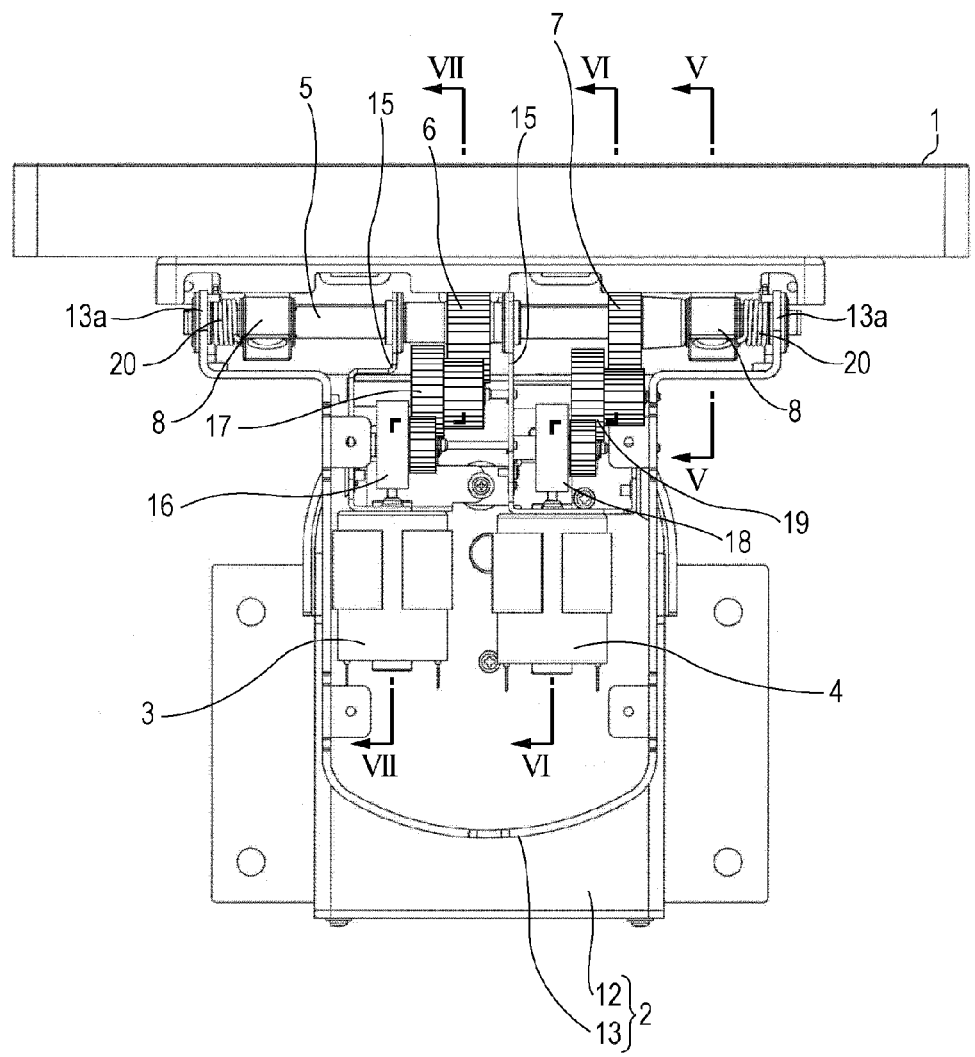
FIG. 4 is a plan view of the display device.

Next, an operation of the display device having the above configuration according to the first embodiment will be described. As shown in FIGS. 1 and 2, when the monitor 1 is held in an upright position at the uppermost position, the raising and lowering gear 6 meshes with the lowermost portion of the rack 9, and the slide plates 21 disposed on the guide members 8 mesh with the lowermost portion of the corresponding guide rails 10.

When the second motor 4 rotates in either the forward or reverse direction, the rotation is transmitted from the worm gear 18 to the pivot gear 7 via the reduction gear train 19, and the pivot gear 7 rotates with the shaft 5, which causes the guide members 8 to co-rotate. As a result, the monitor 1 can pivot about the shaft 5 with respect to the base 2 since the rotation of the guide members 8 is transmitted to the monitor 1 via the guide rail 10. Accordingly, tilt adjustment (tilt operation) for adjusting the monitor 1 to a desired tilt angle can be performed. Specifically, when the pivot gear 7 rotates in clockwise direction shown in FIG. 6 (the arrow A direction), the tilt angle of the monitor 1 is adjusted to a forward inclined position which is shown in the dotted line in FIG. 2. On the other hand, when the pivot gear 7 rotates in counterclockwise direction shown in FIG. 6 (the arrow B direction), the tilt angle of the monitor 1 is adjusted to a backward inclined position which is shown in the double dotted line in FIG. 2. During such tilt adjustment of the monitor 1, the raising and lowering gear 6 idly rotates and does not rotate along with the shaft 5, and the monitor 1 pivots about the shaft 5 which is the center of rotation of the raising and lowering gear 6. Accordingly, meshing between the raising and lowering gear 6 and the rack 9 is not affected.

Figure 11:
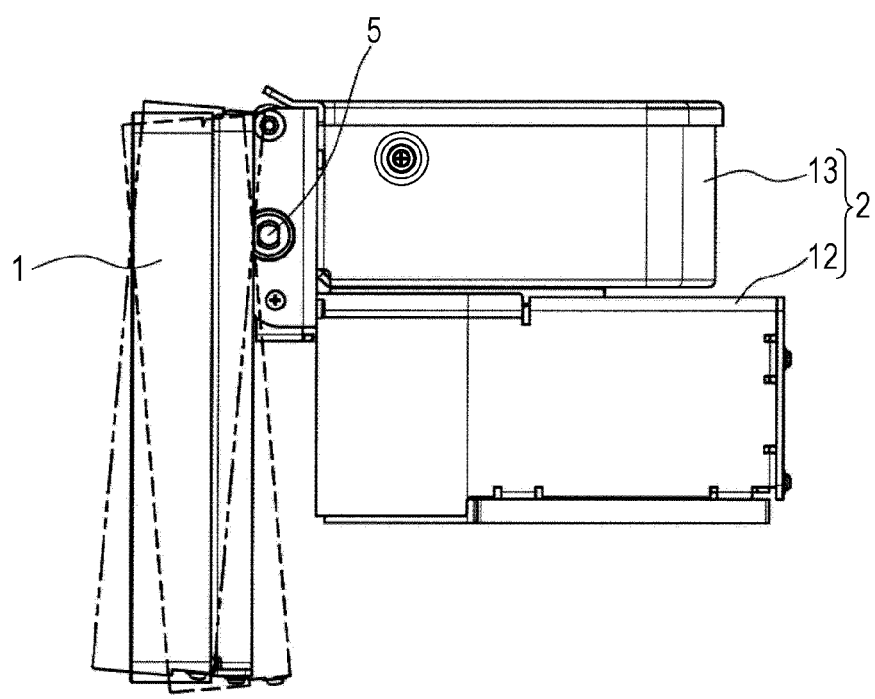
FIG. 11 is a side view which shows an operation state of the display device.

When the first motor 3 rotates in either the forward or reverse direction in a state that the monitor 1 is held in the upright position at the uppermost position, the rotation is transmitted from the worm gear 16 to the raising and lowering gear 6 via the reduction gear train 17, which causes the raising and lowering gear 6 to rotate about the shaft 5. As a result, the mesh position between the raising and lowering gear 6 and the rack 9 is displaced upward from the lowermost position, and accordingly, the guide rails 10 are guided by the slide plates 21 of the corresponding guide members 8 and displaced downward. Accordingly, a height adjustment (raising and lowering operation) for adjusting the monitor 1 to a desired height position can be performed. Specifically, when the raising and lowering gear 6 rotates in a clockwise direction shown in FIG. 7 (the arrow A direction), the mesh position between the raising and lowering gear 6 and the rack 9 is displaced upward, and accordingly, the height position of the monitor 1 with respect to the base 2 is displaced downward. When the mesh position between the raising and lowering gear 6 and the rack 9 is displaced to the uppermost position, the monitor 1 moves to the lowermost position as shown in FIG. 11. On the other hand, when the raising and lowering gear 6 rotates in counterclockwise direction shown in FIG. 7 (the arrow B direction), the mesh position between the raising and lowering gear 6 and the rack 9 is displaced downward, and accordingly, the height position of the monitor 1 with respect to the base 2 is displaced upward. During such height adjustment of the monitor 1, the shaft 5, the pivot gear 7 and the guide members 8 do not rotate. Accordingly, the guide rails 10 can move along the slide plate 21 of the guide members 8 which are held at any angle, thereby allowing the monitor 1 to be raised or lowered not only in the upright position but also in any inclined position.

Accordingly, the monitor 1 can be held at any height position between the uppermost position and the lowermost position by adjusting the rotation direction and the rotation amount of the first motor 3. In addition, the tilt adjustment can be performed regardless of the height position of the monitor 1. For example, when the monitor 1 is held at the lowermost position as shown in FIG. 11, the tilt angle of the monitor 1 can be adjusted to the upright position which is shown in the solid line in FIG. 11 or adjusted to the forward inclined position shown in the dotted line or the backward inclined position shown in the double dotted line in FIG. 11 by adjusting the rotation direction and the rotation amount of the second motor 4.

As described above, in the display device according to the first embodiment, the rack 9 and the guide rails 10 are disposed on the back face of the monitor 1, and when the raising and lowering gear 6 that meshes with the rack 9 rotates in either the forward or reverse direction by a drive source of the first motor 3, rotation of the raising and lowering gear 6 is converted into a linear motion of the monitor 1 via the mesh portion of the rack 9. Accordingly, the guide rails 10 move in the up and down direction while being guided by the slide plates 21 which are integrally connected to the guide members 8, and the height position of the monitor 1 can be adjusted. Further, when the guide members 8 that guide the guide rails 10 rotate by a drive source of the second motor 4, the monitor 1 pivots about the shaft 5 by rotation of the guide members 8, and the tilt angle of the monitor 1 can be adjusted. Since the raising and lowering gear 6 is rotatably supported by the shaft 5 and the pivot gear 7 and the guide members 8 are unrotatably supported by the shaft 5, the pivot gear 7 and the guide members 8 do not rotate during the raising and lowering operation of the monitor 1 performed by rotation of the raising and lowering gear 6, and the raising and lowering gear 6 does not rotate during the tilt adjustment of the monitor 1 performed by rotation of the guide members 8. Accordingly, the tilt adjustment can be performed regardless of the height position of the monitor 1. In addition, since the rotation center of the raising and lowering gear 6 and the pivot center of the guide member 8 are coaxially located, the entire depth dimension of the display device can be reduced.

Further, the rack 9 is disposed at the center portion on the back face of the monitor 1 and a pair of guide rails 10 is disposed on both sides of the rack 9 on the back face of the monitor 1, and the guide members 8 are supported on both ends of the shaft 5 corresponding to the guide rails 10. Accordingly, the raising and lowering operation and the tilt operation of the monitor 1 can be smoothly performed in a balanced manner.

Further, the shaft 5 includes the holding section 5a having a circular cross section and the stepped down portion 5b having a cross section of a non-circular shape. The raising and lowering gear 6 is rotatably supported by the holding section 5a, while the pivot gear 7 and the guide members 8 are unrotatably engaged with the stepped down portion 5b. Accordingly, the raising and lowering gear 6, the pivot gear 7 and the guide members 8 can be easily mounted on the same shaft 5. Moreover, since the shaft 5 can be easily manufactured by chamfering both ends of the round rod made of a metal, there is no concern for an increase in cost of the shaft 5.

Although the pivot gear 7 and the guide members 8 are unrotatably supported by the shaft 5 in the first embodiment so that the rotation of the pivot gear 7 is transmitted to the guide members 8 via the shaft 5, a gear section may be integrally formed on the end face of the guide member 8 instead of providing the pivot gear 7 so that the rotation of the second motor 4 is directly transmitted from the gear section to the guide members 8. In this case, the gear section may be formed as a sector gear having teeth continuous over a predetermined range in the circumferential direction of the shaft 5 since a required tilt angle of the monitor 1 is within 90 degrees at most, or alternatively, the gear section may be a spur gear which is continuous along the entire circumference of the shaft 5.

Figure 12:
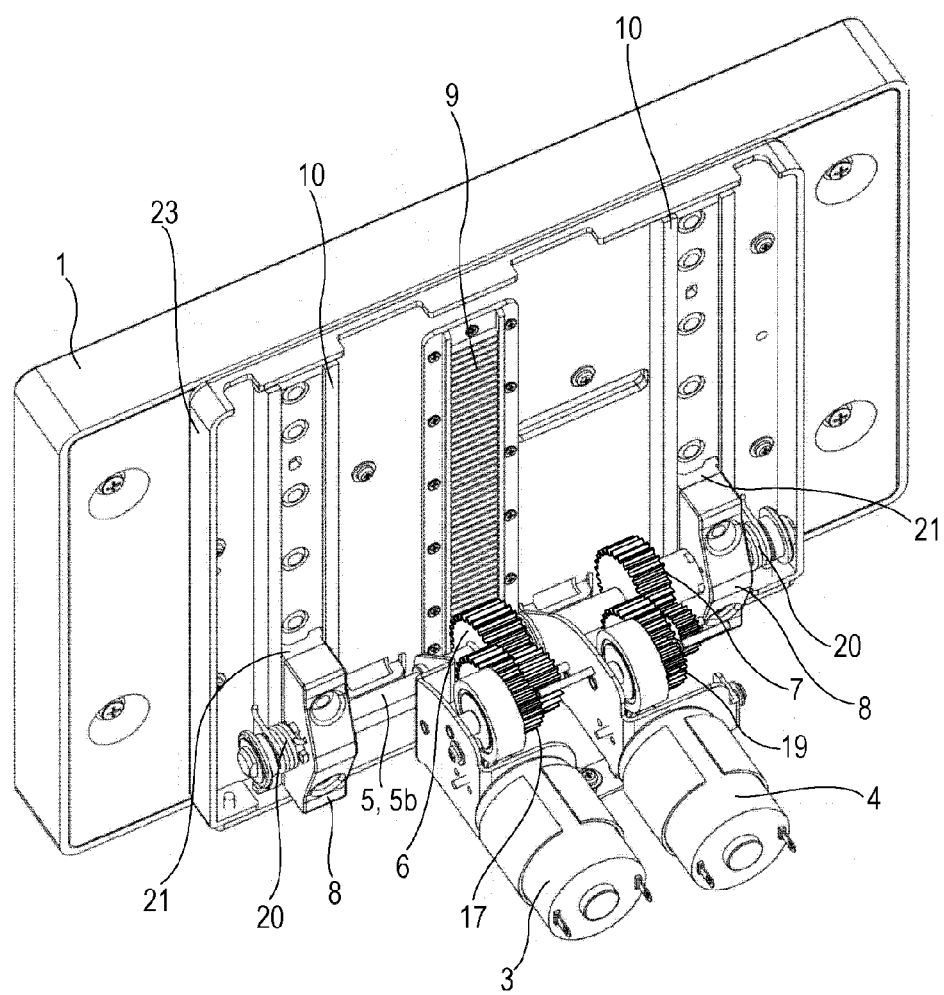
FIG. 12 is a perspective view of a main part of the display device according to a second embodiment of the present invention.
Figure 13:
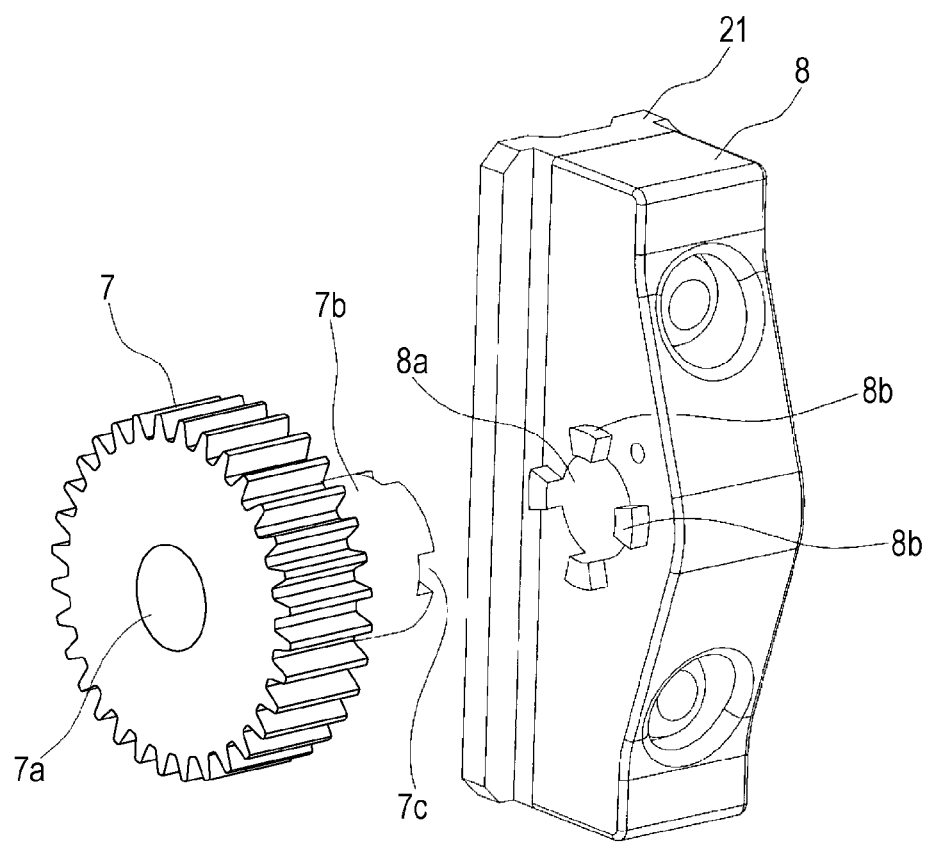
FIG. 13 is an explanatory view of a guide member and a pivot gear provided in the display device.

Next, a display device according to the second embodiment of the invention will be described. As shown in FIGS. 12 and 13, in the display device, the raising and lowering gear 6 is unrotatably supported by the shaft 5, while the pivot gear 7 and the guide members 8 are rotatably supported by the shaft 5. That is, the relationship between a member rotatably supported by the shaft 5 and a member unrotatably supported by the shaft 5 is opposite to that of the first embodiment.

That is, the shaft 5 is a round rod made of a metal which is chamfered in double D shape across the entire length, and the whole chamfered portion is the stepped down portion 5b having a cross section of a non-circular shape. The raising and lowering gear 6 is unrotatably supported by the shaft 5 by inserting the non-circular shaft hole over the stepped down portion 5b, while the pivot gear 7 and the guide members 8 are rotatably supported by the shaft 5 by inserting the circular shaft holes 7a, 8a over the stepped down portion 5b.

As shown in FIG. 13, the pivot gear 7 has a cylindrical section 7b which protrudes in the axis direction of the shaft hole 7a, and a plurality of engagement recesses 7c is formed on the end face of the cylindrical section 7b in the circumferential direction with a predetermined space between each other. Further, a plurality of engagement projections 8b is formed on the side end face of the guide member 8 along the outer peripheral edge of the shaft hole 8a. The pivot gear 7 and the guide member 8 are integrally connected to each other by fitting the engagement recesses 7c and the engagement projections 8b and idly rotate about the shaft 5. Further, unlike the above configuration, engagement projections may be provided on the pivot gear 7 and the engagement recesses may be provided on the side end face of the guide member 8 so that the pivot gear 7 and the guide member 8 may be integrally connected to each other by fitting the engagement recesses 7c and the engagement projections 8b.

In the display device having the above configuration according to the second embodiment, the raising and lowering gear 6 is unrotatably supported by the shaft 5, while the pivot gear 7 and the guide members 8 are rotatably supported by the shaft 5. Accordingly, when the raising and lowering gear 6 rotates by a drive source of the first motor 3, the raising and lowering gear 6 integrally rotates with the shaft 5, while the pivot gear 7 and the guide members 8 idly rotate about the shaft 5 and do not rotate. Further, when the pivot gear 7 rotates by a drive source of the second motor 4, the pivot gear 7 and the guide members 8 integrally rotate about the shaft 5 as a pivot point, while the raising and lowering gear 6 and the shaft 5 do not rotate.

Accordingly, similar to the above described first embodiment, the monitor 1 can be held at any height position between the uppermost position and the lowermost position by adjusting the rotation direction and the rotation amount of the first motor 3. In addition, the tilt adjustment can be performed regardless of the height position of the monitor 1 by adjusting the rotation direction and the rotation amount of the second motor 4. Further, since the rotation center of the raising and lowering gear 6 and the pivot center of the guide member 8 are coaxially located, the entire depth dimension of the display device can be reduced.

Although the guide rail 10 used as a guided member in the above embodiments has a U-shaped cross section on both ends in the width direction, and the U-shaped portions engage with each side of the slide plate 21 so that the guide rail 10 moves while being guided by the guide member 8, the guided member may not be limited to the guide rail 10. For example, a straight guide shaft may be used as a guided member, and the cylindrical member may be slidably fitted on the guide shaft and integrally connected to the guide member 8.

Further, the shaft 5 may not necessarily be in the form of a single rod, and a plurality of separate rods may be coaxially arranged in the width direction of the monitor 1.

Although the raising and lowering gear 6 and the guide member 8 in the above embodiment are individually driven by the first motor 3 and the second motor 4, respectively, a single motor may be used which is configured to transmit a rotation force of the motor to a first drive mechanism that drives the raising and lowering gear 6 and a second drive mechanism that drives the guide member 8 via a known power transmission path switching mechanism.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device in which a monitor disposed on a front face of a base is supported in a manner capable of raising and lowering and tilting with respect to the base, comprising:
    a rack and a guided member mounted on a back face of the monitor so as to extend parallel to each other in a height direction of the monitor;
    a raising and lowering gear that meshes with the rack;
    a first drive mechanism that drives rotation of the raising and lowering gear;
    a guide member that guides the guided member in a manner capable of raising and lowering;
    a second drive mechanism transmitting a drive force that drives rotation of the guide member; and
    a shaft rotatably supported by the base so as to extend in a width direction of the monitor, wherein one of the raising and lowering gear and the guide member is rotatably supported by the shaft and the other is unrotatably supported by the shaft.

2. The display device according to claim 1, wherein the raising and lowering gear is rotatably supported by the shaft and the guide member and a pivot gear are unrotatably supported by the shaft, and the pivot gear and the shaft and the guide member are driven to integrally rotate by transmitting a drive force of the second drive mechanism to the pivot gear.

3. The display device according to claim 1, wherein the raising and lowering gear is unrotatably supported by the shaft and the guide member and a pivot gear are rotatably supported by the shaft, and a drive force of the second drive mechanism is transmitted to the guide member via the pivot gear by connecting the guide member and the pivot gear in an unrotatable manner.

4. The display device according to claim 3, wherein an engagement projection that projects in the axis direction of the shaft is formed on one of the pivot gear and the guide member and an engagement recess for engaging with the engagement projection is formed on the other so that the pivot gear and the guide member are unrotatably connected when the engagement projection and the engagement recess are fitted to each other.

5. The display device according to claim 1, wherein the rack is disposed at a center portion on the back face of the monitor and a pair of the guided members is disposed on both sides of the rack on the back face of the monitor, and a pair of guide members which corresponds to the guided members is supported on both ends of the shaft.

6. The display device according to claim 1, wherein the shaft has a holding section having a circular cross section and a stepped down portion having a non-circular cross section, and one of the raising and lowering gear and the guide member is rotatably supported by the holding section and the other is unrotatably engaged with the stepped down portion.

7. A display device in which a monitor disposed on a front face of a base is supported in a manner capable of separately raising and lowering and tilting with respect to the base, comprising:
    a rack mounted on a back face of the monitor in a height direction of the monitor;
    a raising and lowering gear that meshes with the rack;
    a first drive mechanism that drives rotation of the raising and lowering gear;
    a guide member slidably attached to the back face of the monitor; and
    a second drive mechanism transmitting a drive force that drives rotation of the guide member to tilt the monitor.

8. The display device according to claim 7, wherein the raising and lowering gear is rotatably supported by a shaft and the guide member and a pivot gear are unrotatably supported by the shaft, and the pivot gear and the shaft and the guide member are driven to integrally rotate by transmitting a drive force of the second drive mechanism to the pivot gear.

9. The display device according to claim 7, wherein the raising and lowering gear is unrotatably supported by a shaft and the guide member and a pivot gear are rotatably supported by the shaft, and a drive force of the second drive mechanism is transmitted to the guide member via the pivot gear by connecting the guide member and the pivot gear in an unrotatable manner.

10. The display device according to claim 9, wherein an engagement projection that projects in the axis direction of the shaft is formed on one of the pivot gear and the guide member and an engagement recess for engaging with the engagement projection is formed on the other so that the pivot gear and the guide member are unrotatably connected when the engagement projection and the engagement recess are fitted to each other.

11. The display device according to claim 7, wherein the rack is disposed at a center portion on the back face of the monitor and a pair of the guide members is disposed on both sides of the rack on the back face of the monitor.

12. The display device according to claim 7, wherein a shaft has a holding section having a circular cross section and a stepped down portion having a non-circular cross section, and one of the raising and lowering gear and the guide member is rotatably supported by the holding section and the other is unrotatably engaged with the stepped down portion.

13. A display device in which a monitor disposed on a front face of a base is supported in a manner capable of separately raising and lowering and tilting with respect to the base, comprising:
    a raising and lowering gear for raising and lowering the monitor;
    a first drive mechanism that drives rotation of the raising and lowering gear;
    a guide member slidably attached to the monitor in a height direction;
    a second drive mechanism transmitting a drive force that drives rotation of the guide member to tilt the monitor; and
    a shaft extending in a width direction of the monitor and supporting the raising and lowering gear and the guide member.

14. The display device according to claim 13, wherein the raising and lowering gear is rotatably supported by the shaft and the guide member and a pivot gear are unrotatably supported by the shaft, and the pivot gear and the shaft and the guide member are driven to integrally rotate by transmitting a drive force of the second drive mechanism to the pivot gear.

15. The display device according to claim 13, wherein the raising and lowering gear is unrotatably supported by the shaft and the guide member and a pivot gear are rotatably supported by the shaft, a drive force of the second drive mechanism is transmitted to the guide member via the pivot gear by connecting the guide member and the pivot gear in an unrotatable manner.

16. The display device according to claim 15, wherein an engagement projection that projects in the axis direction of the shaft is formed on one of the pivot gear and the guide member and an engagement recess for engaging with the engagement projection is formed on the other so that the pivot gear and the guide member are unrotatably connected when the engagement projection and the engagement recess are fitted to each other.

17. The display device according to claim 13, wherein a rack is disposed at a center portion on the back face of the monitor and meshes with the raising and lowering gear, and a guide member is disposed on each side of the rack on the back face of the monitor and is supported on a respective end of the shaft.

18. The display device according to claim 13, wherein the shaft has a holding section having a circular cross section and a stepped down portion having a non-circular cross section, and one of the raising and lowering gear and the guide member is rotatably supported by the holding section and the other is unrotatably engaged with the stepped down portion.

* * * * *